Patented June 21, 1927.

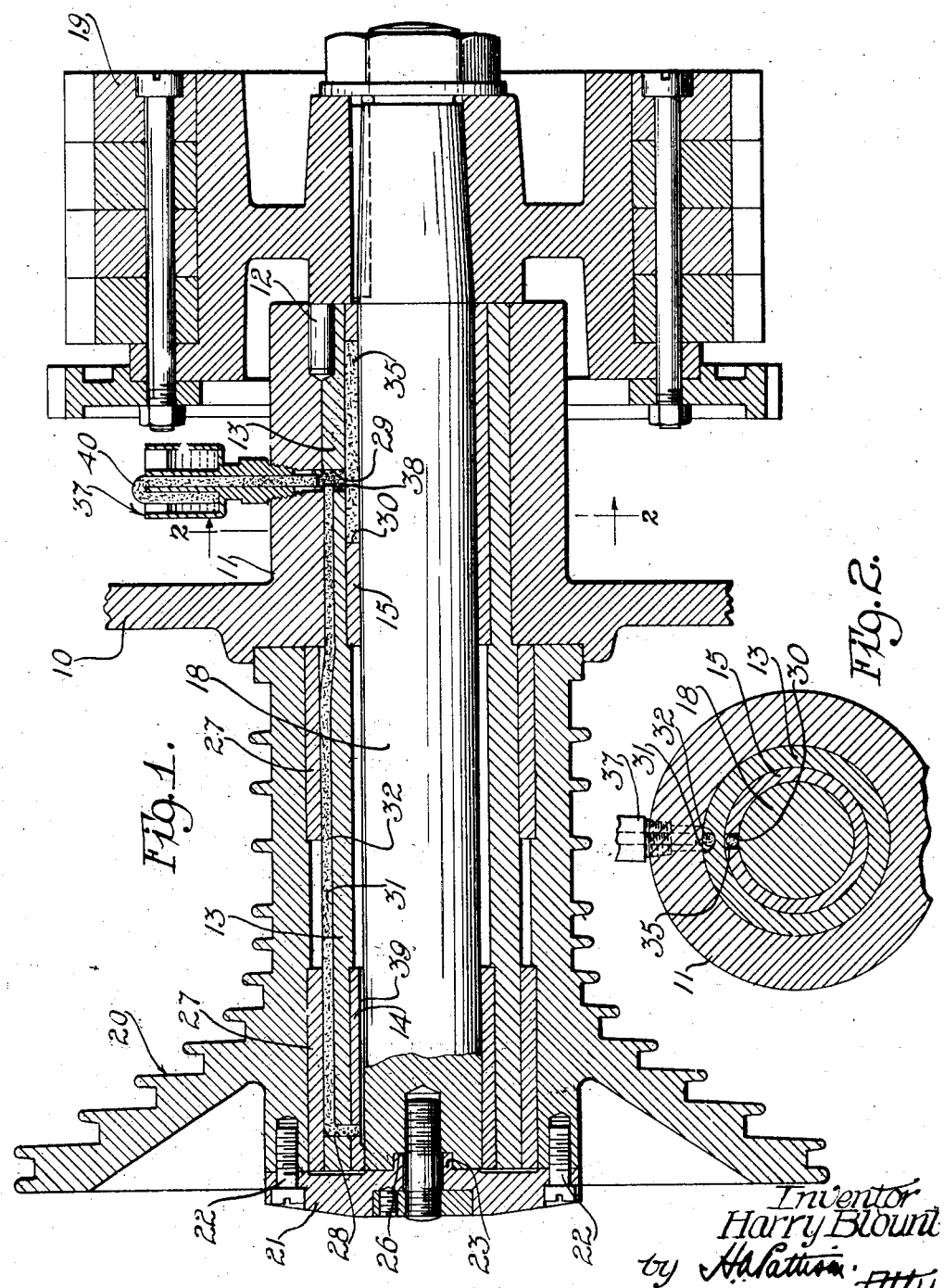

1,632,874

UNITED STATES PATENT OFFICE.

HARRY BLOUNT, OF OAK PARK, ILLINOIS, ASSIGNOR TO WESTERN ELECTRIC COMPANY, INCORPORATED, OF NEW YORK, N. Y., A CORPORATION OF NEW YORK.

MEANS FOR LUBRICATING BEARING SURFACES.

Application filed November 4, 1924. Serial No. 747,771.

This invention relates to means for lubricating bearing surfaces, and more particularly to means for lubricating bearing surfaces by capillary attraction.

The object of the invention is to provide an improved means for lubricating a plurality of bearing surfaces.

In order to accomplish this object in one embodiment of the invention as applied to the bearings of the capstan on a wire drawing machine there is provided a lubricant container equipped with a single wick which supplies lubricant through an auxiliary lubricant container to a plurality of wicks in contact with a plurality of bearing surfaces positioned in different planes and at separated points. One of the latter wicks extends in an angular direction at one end and contacts with another bearing surface concentrically disposed with respect to one of the other bearing surfaces.

It is believed that the invention will be clearly understood from the following description taken in connection with the accompanying drawings illustrating one embodiment of the invention, in which Fig. 1 is a vertical section through the axis of the capstan on a wire drawing machine showing the invention as applied to the bearings thereof, and Fig. 2 is a section taken on the line 2—2 thereof looking in the direction indicated by the arrows.

As shown in the drawings, 10 designates a wall or supporting frame of a wire drawing machine, the wall being provided with a rearwardly extending bearing portion 11. Secured within the bore of the bearing 11 by a pin 12 is a stationary sleeve 13 which extends forwardly of the wall 10, and secured to the sleeve 13 within the bore thereof at opposite ends are bearing bushings 14 and 15 within which a shaft 18 turns. Suitably secured to the right hand end of the shaft 18 is a gear 19 which is driven through suitable means (not shown). Rotatably mounted upon the periphery of the sleeve 13 is a stepped capstan 20, the capstan being rotated by the shaft 18 through a cap member 21. The cap 21 is secured to the capstan 20 by a plurality of screws 22 and to the shaft 18 by a key-like formation 23 formed upon the cap and fitting within a depression 26 of a similar outline formed in the left hand end face of the shaft 18. The bore of the capstan 20 is fitted with spaced bearing bushings 27 which have a running fit upon the stationary sleeve 13.

Formed in the wall of the sleeve 13 and the bushing 14 adjacent to the left hand end thereof is an opening or duct 28 and in the sleeve 13 adjacent the opposite end thereof is a second opening or duct 29 which connects with a slot or channel 30 formed in the wall of the bushing 15 and extending longitudinally thereof. The sleeve 13 is provided with a channel or duct 31 extending longitudinally thereof which connects the openings 28 and 29 and within the duct 31 is fitted a wick 32 of suitable absorbent or fibrous material. The wick 32 at one end is turned at right angles and entered within the duct 28, the opposite end projecting into the duct 29. Fitted within the channel 30 in the bushing 15 is a wick 35 and carried by the bearing 11 in line with the duct 29 and channel 30 is a suitable wick lubricator 37. The duct 29 in the sleeve 13 is loosely packed with cotton waste or other suitable material indicated at 38 which serves as an auxiliary lubricant reservoir. Formed longitudinally within the bore of the bushing 14 and connecting with the duct 28 therein is a channel or duct 39.

In operation, the lubricant, such as oil, will be fed from the lubricator 37 by capillary attraction through a wick 40 associated therein, down to the auxiliary lubricant container formed by the duct 29 carrying the cotton waste 38, and thence by capillary attraction through the wicks 32 and 35. The wick 32 will thus continually coat the bearing surfaces of the bushings 27 with a film of lubricant and also through its right angled portion within the duct 28 of the bushing 14 and through the duct 39, the peripheral surface of the shaft 18 having a bearing within the stationary sleeve 13 will be supplied with a film of lubricant. The wick 35 carried by the bushing 15 and engaging the waste 38 on its upper side and contacting with the peripheral surface of the shaft 18 upon its lower side, insures the lubricating of the bearing surface within the bushing 15.

By using the simple lubricating system of the hereinbefore described type and following the method, a plurality of bearing surfaces positioned in different horizontal planes and at separated points may be efficiently lubricated from a common supply.

What is claimed is:

1. The combination with a frame, a sleeve carried thereby provided with a plurality of separated bearing surfaces, a driving shaft mounted within the sleeve, a driven member rotatably mounted upon the periphery of the sleeve and operatively connected to said shaft, of a lubricant container carried by said frame, said sleeve provided with a duct extending longitudinally thereof and communicating at each end with an angularly disposed duct, the duct at one end communicating with said lubricant container, and a wick lying in said duct and its angularly disposed branches and engaging with all the bearing surfaces.

2. The combination with a frame, a bearing sleeve carried thereby, a plurality of bearings mounted thereon, a driving shaft mounted within the sleeve, a drive member rotatably mounted upon the periphery of the sleeve and operatively connected to said shaft, of a lubricant container carried by said frame, said sleeve provided with a duct extending longitudinally thereof and communicating at each end with an angularly disposed duct, the duct at one end communicating with said lubricant container, and a wick lying in said duct and its angularly disposed branches with different faces thereof engaging the bearings for supplying lubricant thereto.

In witness whereof, I hereunto subscribe my name this 24th day of October, A. D. 1924.

HARRY BLOUNT.